(12) United States Patent
Kimura et al.

(10) Patent No.: US 10,176,031 B2
(45) Date of Patent: Jan. 8, 2019

(54) ARITHMETIC PROCESSING DEVICE AND METHOD OF CONTROLLING ARITHMETIC PROCESSING DEVICE

(71) Applicant: FUJITSU LIMITED, Kawasaki-shi, Kanagawa (JP)

(72) Inventors: Kouji Kimura, Kokubunji (JP); Yoshiteru Ohnuki, Machida (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 111 days.

(21) Appl. No.: 15/205,507

(22) Filed: Jul. 8, 2016

(65) Prior Publication Data
US 2017/0024268 A1    Jan. 26, 2017

(30) Foreign Application Priority Data
Jul. 22, 2015  (JP) .................. 2015-144938

(51) Int. Cl.
*G06F 11/00* (2006.01)
*G06F 11/07* (2006.01)
*G06F 9/38* (2018.01)

(52) U.S. Cl.
CPC ........ *G06F 11/0763* (2013.01); *G06F 9/3861* (2013.01); *G06F 11/0721* (2013.01); *G06F 11/0793* (2013.01)

(58) Field of Classification Search
CPC ............... G06F 11/0763; G06F 9/3013; G06F 11/0721; G06F 11/0793; G06F 9/3861
See application file for complete search history.

(56) References Cited

U.S. PATENT DOCUMENTS

| | | | | |
|---|---|---|---|---|
| 5,604,753 A | * | 2/1997 | Bauer ................. | G06F 11/1064 714/17 |
| 7,370,230 B1 | * | 5/2008 | Flake .................. | G06F 11/1008 714/10 |
| 7,673,190 B1 | * | 3/2010 | Engelbrecht ........ | G06F 9/30145 714/49 |
| 2010/0088572 A1 | * | 4/2010 | Ohnuki ............... | G06F 9/30105 714/755 |

FOREIGN PATENT DOCUMENTS

WO     2008/152728 A1    12/2008

* cited by examiner

*Primary Examiner* — Jason B Bryan
(74) *Attorney, Agent, or Firm* — Staas & Halsey LLP

(57) ABSTRACT

An arithmetic processing device includes: a first register configured to hold data to be used to execute an instruction; a second register configured to hold a portion of the data held in the first register; a computing circuit configured to execute computation using the data held in the second register; a first error detector configured to detect whether or not an error is included in the data to be transferred by the first register to the second register; a controller configured to interrupt the execution of the instruction if the first error detector detects the error in the data; and an error corrector configured to correct the error in the data held in the first register if the first error detector detects the error in the data.

7 Claims, 8 Drawing Sheets

FIG. 8

| TIME | BEFORE T1 | T1 | T2 | T3 | T4 | T5 | T6 | T7 | T8 | T9 | UP TO Tj | Tj+1 | Tj+2 | Tj+3 |
|---|---|---|---|---|---|---|---|---|---|---|---|---|---|---|
| CASE 1 SAVE INSTRUCTION FLOW 1 FLOW 2 | | TRANSFER OF Wn+1 P | ☆ PT P | B1 PT P | B2 PT | ☆ X B1 | U B2 | RESULT →Wn+1 C ☆ | RETURN OF Wn C | | | | | |
| NEXT INSTRUCTION 1 (USE OF Wn+1) | | | | | | | | | U | C | | | | |
| CASE 2 SAVE INSTRUCTION FLOW 1 FLOW 2 | | TRANSFER OF Wn+1 P | ✶ PT P | B1 PT P | B2 PT | ☆ X B1 | →STOP OF COMMIT U B2 | (C) X ☆ | (C) | | CANCELLATION OF COMPUTATION CORRECTION OF ERROR OF MASTER REGISTER | RE-EXECUTION OF INSTRUCTION P | ☆ PT P | B1 PT P |
| NEXT INSTRUCTION 1 (USE OF Wn+1) | | | | | | | | | U | | | | | |
| COMPARATIVE EXAMPLE SAVE INSTRUCTION FLOW 1 FLOW 2 | | TRANSFER OF Wn+1 P | ☆ PT P | B1 PT P | B2 PT | ☆ X B1 | U B2 | RESULT →Wn+1 C ✶ | RETURN OF Wn C | | | | | |
| NEXT INSTRUCTION 1 (USE OF Wn+1) | | | | | | | | X ✶ | | | | | | |

☆: ERROR IS NOT DETECTED ✶: ERROR IS DETECTED

ARITHMETIC PROCESSING DEVICE AND METHOD OF CONTROLLING ARITHMETIC PROCESSING DEVICE

CROSS-REFERENCE TO RELATED APPLICATION

This application is based upon and claims the benefit of priority of the prior Japanese Patent Application No. 2015-144938, filed on Jul. 22, 2015, the entire contents of which are incorporated herein by reference.

FIELD

The embodiments discussed herein are related to an arithmetic processing device and a method of controlling the arithmetic processing device.

BACKGROUND

An arithmetic processing device such as a central processing unit (CPU) includes a cache memory for holding a portion of data stored in a main storage device, an executing section for executing an instruction, and a controller for controlling the executing section and the like. The executing section has a first register file for holding a portion of the data held in the cache memory, a second register file for holding a portion of the data held in the first register file, and a computing section for executing computation based on an instruction, for example. The computing section executes the computation using data transferred from the second register file.

An error may occur in data held in a register file such as the first register file. Thus, an arithmetic processing device, which causes the register file to hold data having, added thereto, parity data for error detection and error checking and correction (ECC) data for error correction, has been proposed (refer to, for example, Domestic Re-publication of PCT International Publication Pamphlet No. WO2008/152728). An arithmetic processing device of this type includes an error detector for detecting the occurrence of an error and an error corrector for correcting the error.

In a pipeline process of executing each instruction at multiple stages, the result of computing a first instruction may be written back to a register (for example, a register included in the first register file) holding input data to be used for computation of a second instruction succeeding the first instruction. In this case, in an arithmetic processing device that executes a process of determining an error upon the transfer of data from the second register file to a computing section, it may be difficult to correct data including the error and re-execute the instructions. For example, if a commit for completing the first instruction is not stopped in time, a computed result obtained based on the commit for the first instruction is written to the register holding the input data (data including the error) to be used for the second instruction and it is difficult to correct the error in the input data and re-execute the second instruction.

In addition, if the first instruction is a multi-flow instruction obtained by dividing a single instruction into multiple flows, and a commit for the first flow of the first instruction is not stopped in time, it is difficult to correct the error in the input data and re-execute the second instruction. For example, if the first instruction is not re-executed due to the termination of a commit for the second and later flows of the first instruction, the second instruction that succeeds the first instruction is not re-executed.

In the state in which the instructions are not re-executed, functions of the computing section and the like are stopped and the performance of the arithmetic processing device is reduced, compared with a case where the instructions are re-executed.

According to an aspect, an arithmetic processing device and a method of controlling the arithmetic processing device that are disclosed herein aim to suppress a reduction in the performance of the arithmetic processing device.

SUMMARY

According to an aspect of the invention, an arithmetic processing device includes; a first register configured to hold data to be used to execute an instruction; a second register configured to hold a portion of the data held in the first register; a computing circuit configured to execute computation using the data held in the second register; a first error detector configured to detect whether or not an error is included in the data to be transferred by the first register to the second register; a controller configured to interrupt the execution of the instruction if the first error detector detects the error in the data; and an error corrector configured to correct the error in the data held in the first register if the first error detector detects the error in the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a pipeline process of the arithmetic processing device illustrated in FIG. 2.

DESCRIPTION OF EMBODIMENTS

Hereinafter, embodiments are described with reference to the accompanying drawings.

Figure 1:
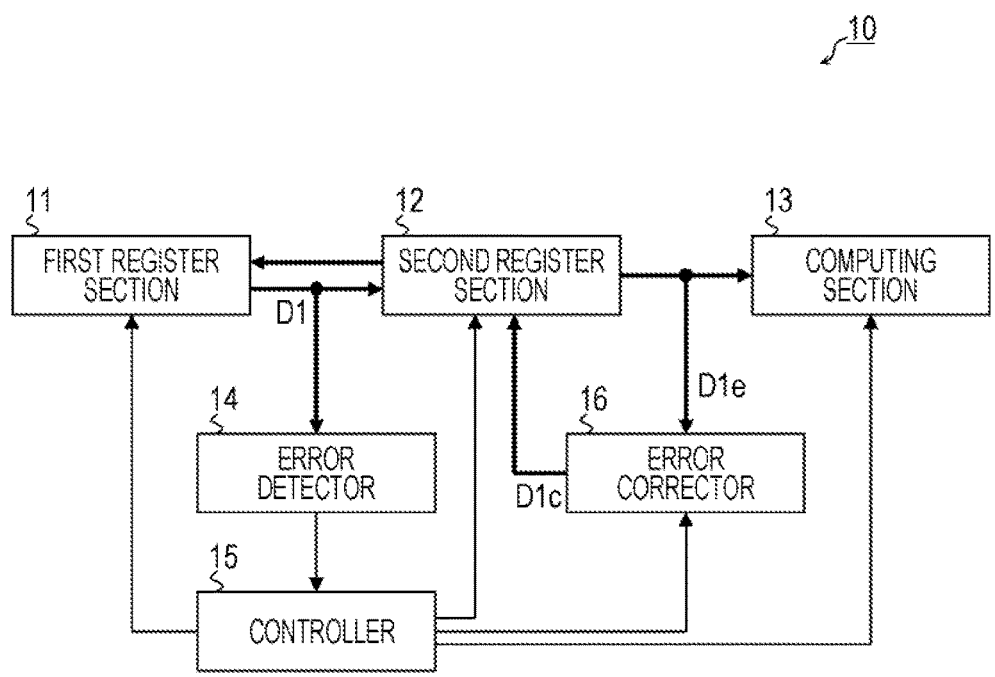
FIG. 1 is a diagram illustrating an embodiment of an arithmetic processing device and a method of controlling the arithmetic processing device.

FIG. 1 illustrates an embodiment of an arithmetic processing device and a method of controlling the arithmetic processing device. Solid arrows illustrated in FIG. 1 indicate data flow. An arithmetic processing device 10 illustrated in FIG. 1 is a processor such as a CPU configured to execute an instruction, for example. The arithmetic processing device 10 includes a first register section 11, a second register section 12, a computing section 13, an error detector 14, a controller 15, and an error corrector 16.

The first register section 11 holds data having, added thereto, parity data for error detection and ECC data for error correction. For example, the first register section 11 holds a portion of the data held in a cache memory (not illustrated) or the like. The first register section 11 outputs data D1 that is a portion of the held data to the second register section 12 and the error detector 14 based on an instruction from the controller 15. The first register section 11 holds, based on an instruction from the controller 15, data to be written back from the second register section 12.

The error detector 14 is an example of a first error detector configured to detect whether or not an error is included in data to be transferred by the first register section 11 to the second register section 12. For example, the error detector 14 receives the data D1 from the first register section 11 upon the transfer of the data D1 from the first register section 11 to the second register section 12. Then, the error detector 14 uses the parity data and the like included in the data D1 to determine whether or not the data D1 includes an error, and the error detector 14 outputs the result of the determination to the controller 15.

In this manner, the error detector 14 detects whether or not an error is included in the data D1 at a time earlier than the time when the data is transferred to the computing section 13 from the second register section 12.

The second register section 12 holds the data D1 that is the portion of the data held in the first register section 11. The second register section 12 outputs, to the computing section 13, data to be used by the computing section 13. In addition, the second register section 12 holds a computed result (result of computation by the computing section 13) received from the computing section 13 via an update buffer (not illustrated) or the like.

If the error detector 14 detects an error in the data D1 (or if the error detector 14 detects that the data D1 includes the error), the second register section 12 outputs data D1$e$ including the error to the error corrector 16. Then, the second register section 12 receives, from the error corrector 16, data D1$c$ in which the error in the data D1$e$ was corrected, and the second register section 12 outputs the data D1$c$ to the first register section 11. The data D1$e$ that includes the error is also referred to as error data D1$e$. If the data D1 includes the error, the data D1 is also referred to as error data D1.

The computing section 13 is a circuit which executes computation using data held in the second register section 12. If the error detector 14 detects the error in the data D1, the computing section 13 stops the computation based on an instruction from the controller 15.

The controller 15 controls operations of the first register section 11, the second register section 12, the computing section 13, and the error corrector 16 and causes the computing section 13 to execute computation based on an instruction. If the error detector 14 detects the error in the data D1, the controller 15 executes control to interrupt the execution of the instruction. For example, when receiving information indicating that the error is included in the data D1 from the error detector 14, the controller 15 stops a commit for completing the instruction and stops the computation by the computing section 13. The controller 15 causes the data D1$e$ including the error to be transferred from the first register section 11 via the second register section 12 to the error corrector 16.

If the currently executed instruction is a multi-flow instruction obtained by dividing a single instruction into multiple flows, the controller 15 stops a commit for writing a result computed by the computing section 13 to the second register section 12, for example.

The error corrector 16 reads, from the second register section 12, the error data D1$e$ transferred from the first register section 11 to the second register section 12 and corrects the error in the read error data D1$e$ using the ECC data and the like. Then, the error corrector 16 writes, back to the second register section 12, the data D1$c$ in which the error in the error data D1$e$ was corrected. The second register section 12 writes the data D1$c$ back to the first register section 11. Specifically, if the error detector 14 detects the error in the data D1, the error corrector 16 corrects the error in the data held in the first register section 11. Thus, the arithmetic processing device 10 may re-execute the instruction using the data with the corrected error.

In an arithmetic processing device that detects whether or not an error exists upon the transfer of data from the second register section 12 to the computing section 13, a commit may not be stopped in time. If the commit is not stopped in time, the result of executing an instruction for which the commit is not stopped in time is written back to the first register section 11, for example. In this case, the first register section 11 is updated to a state different from that when the first register section 11 outputs error data (data in which an error is detected), and it is, therefore, difficult to reproduce the state when the first register section 11 outputs the error data. Thus, it is difficult to correct the error in the data held in the first register section 11 and re-execute the instruction. In a state in which the instruction is not re-executed, functions of the computing section 13 and the like are stopped, and the performance of the arithmetic processing device is reduced, compared with a case where the instruction is re-executed.

On the other hand, the arithmetic processing device 10 detects whether or not an error is included in the data D1 at a time earlier than the time when the data is transferred to the computing section 13 from the second register section 12. Thus, the frequency at which a commit is not stopped in time may be reduced, compared with a case where a method of detecting whether or not an error exists upon the transfer of data from the second register section 12 to the computing section 13 is used.

As the frequency at which a commit is not stopped in time is reduced, the frequency (frequency at which the instruction is not re-executed) at which the first register section 11 is updated to a state different from that when the first register section 11 outputs the data (error data D1) including the error is reduced. For example, if the first register section 11 is maintained in the state when the first register section 11 outputs the error data D1, the arithmetic processing device 10 may correct the error in the data held in the first register section 11 and re-execute the instruction.

Thus, the error that occurred in the first register section 11 may be reliably corrected and the frequency at which the instruction is not re-executed may be reduced, compared with the case where the method of detecting whether or not an error exists upon the transfer of data from the second register section 12 to the computing section 13 is used. For example, even if the first register section 11 is subjected to noise such as a cosmic ray and data becomes garbled, the error that occurred in the first register section 11 may be corrected and the instruction may be re-executed.

The configuration of the arithmetic processing device 10 is not limited to the example illustrated in FIG. 1. For example, in order to correct the error in the error data D1e, the error corrector 16 may read the error data D1e from the first register section 11 without making the use of the second register section 12. In addition, the error corrector 16 may write the data D1c with the corrected error in the error data D1e back to the first register section 11 without making the use of the second register section 12.

In the embodiment illustrated in FIG. 1, the error detector 14 detects whether or not an error is included in the data D1 upon the transfer of the data from the first register section 11 to the second register section 12. Then, the controller 15 interrupts the instruction based on the fact that the error detector 14 detected the error in the data D1. Thus, the arithmetic processing device 10 may reduce the frequency at which the instruction is not interrupted in time (or the commit is not stopped in time) and reduce the frequency at which the instruction is not re-executed, compared with the case where the method of detecting whether or not an error exists upon the transfer of data from the second register section 12 to the computing section 13 is used. As a result, a reduction in the performance of the arithmetic processing device 10 may be suppressed.

Figure 2:
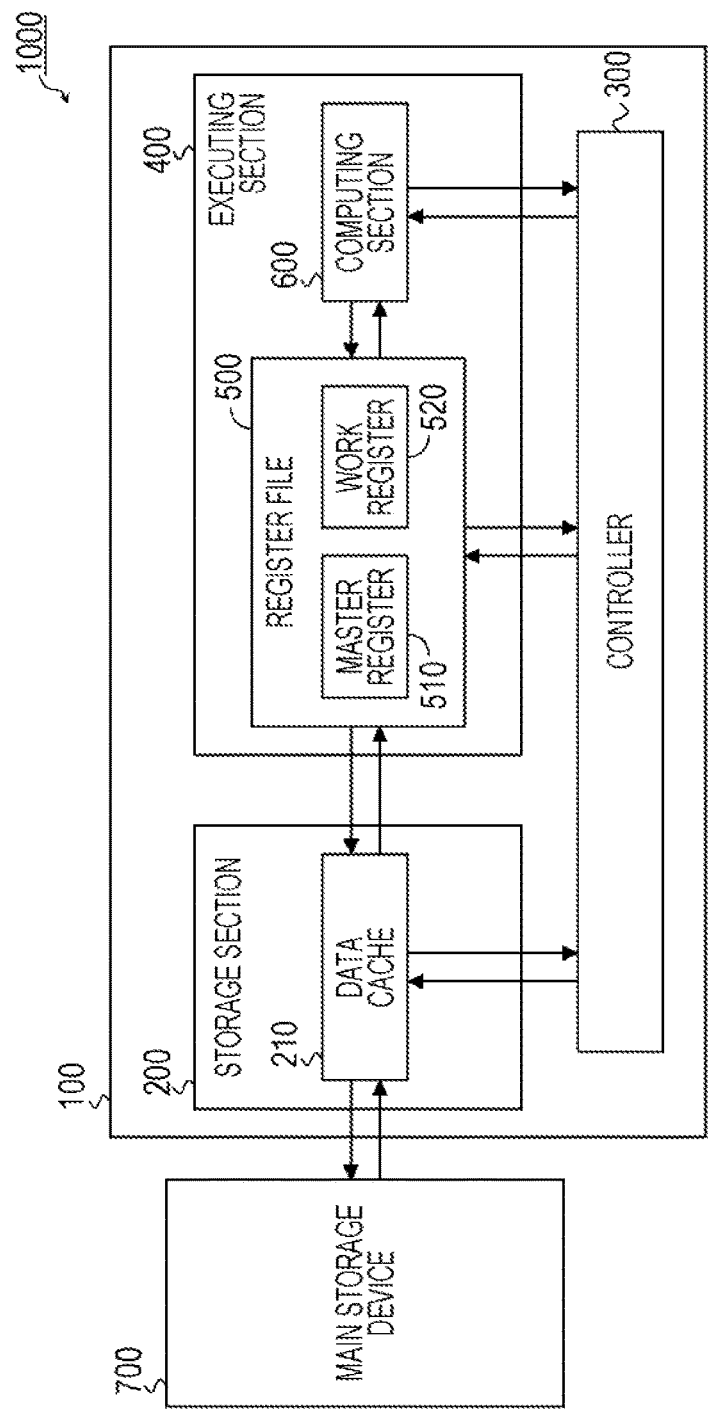
FIG. 2 is a diagram illustrating another embodiment of the arithmetic processing device and the method of controlling the arithmetic processing device.

FIG. 2 illustrates another embodiment of the arithmetic processing device and the method of controlling the arithmetic processing device. Elements that are the same as or similar to the elements described with reference to FIG. 1 are indicated by reference numerals and symbols that are the same as or similar to those illustrated in FIG. 1, and a detailed description thereof is omitted. An arithmetic processing device 100 illustrated in FIG. 2 is, for example, a processor such as a CPU configured to execute a multi-flow instruction obtained by dividing a single instruction into multiple flows. The arithmetic processing device 100 is connected to a main storage device (main memory) 700. For example, the arithmetic processing device 100 and the main storage device 700 are installed in an information processing device 1000.

The arithmetic processing device 100 includes a storage section 200, a controller 300, and an executing section 400. The storage section 200 includes a data cache 210 configured to hold a portion (for example, data to be handled by the executing section 400) of data stored in the main storage device 700. For example, the data cache 210 is a cache memory.

The controller 300 controls operations of the storage section 200 and the executing section 400 and controls the execution of an instruction, the interruption of the instruction, the re-execution of the instruction, and the like. Details of the controller 300 are described with reference to FIG. 4.

The executing section 400 includes a register file 500 and a computing section 600. The register file 500 includes a master register 510 configured to hold a portion of the data held in the data cache 210, a work register 520 configured to hold data to be used by the computing section 600, and the like. The master register 510 is an example of a first register section configured to hold data to be used to execute an instruction, while the work register 520 is an example of a second register section configured to hold a portion of the data held in the first register section (for example, the master register 510). Details of the master register 510 and the work register 520 are described with reference to FIG. 3. Details of the register file 500 are described with reference to FIG. 4.

The computing section 600 is a circuit which executes computation using data held in the work register 520 and transfers a computed result to the register file 500. If an error is detected in data held in the master register 510 or the like, the computing section 600 stops the computation based on an instruction from the controller 300. The configuration of the arithmetic processing device 100 is not limited to the example illustrated in FIG. 2.

Figure 3:
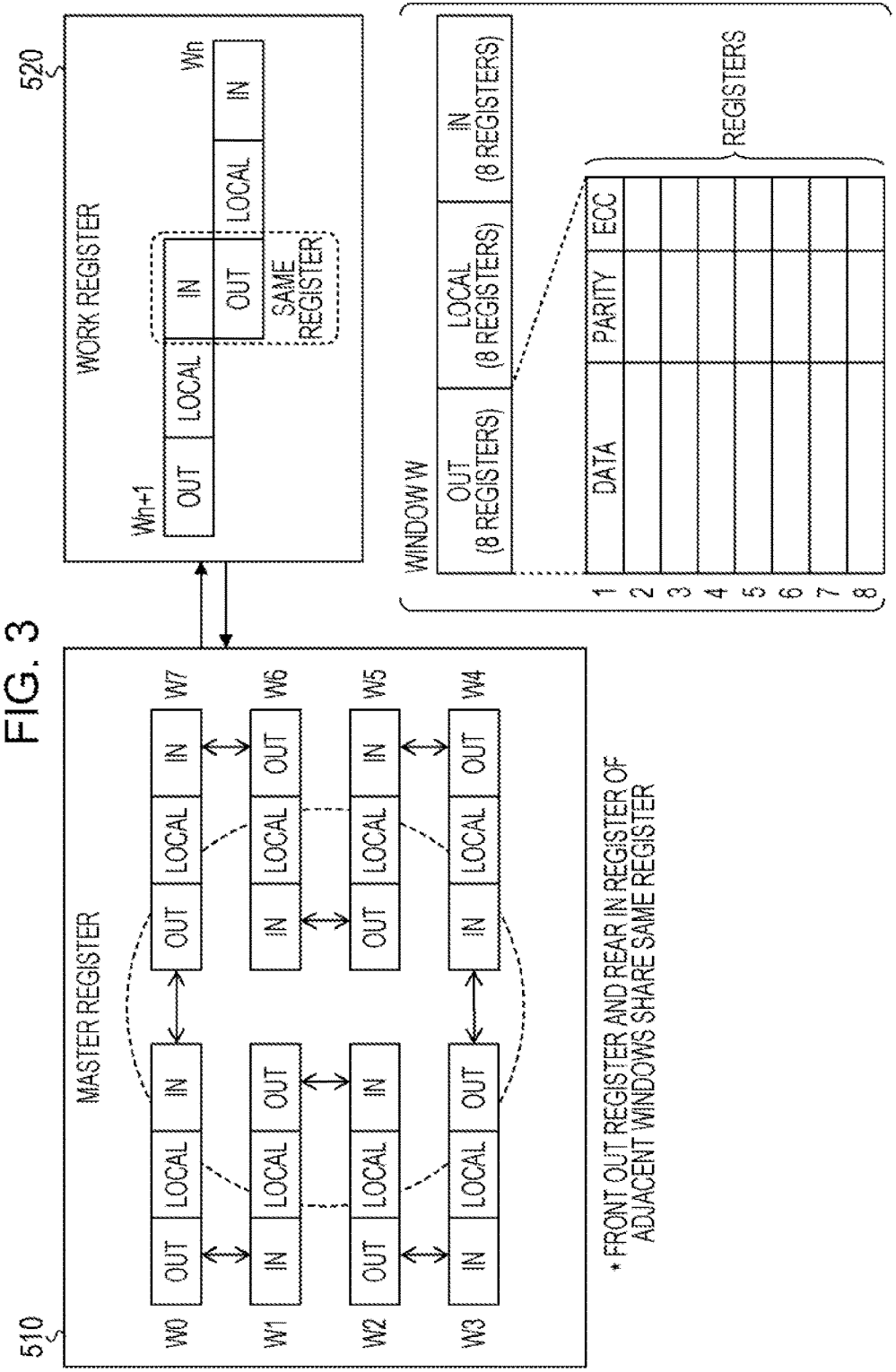
FIG. 3 is a diagram illustrating an example of a master register and a work register that are illustrated in FIG. 2.

FIG. 3 illustrates an example of the master register 510 and the work register 520 that are illustrated in FIG. 2. The master register 510 is a register group having eight windows W (W0 to W7). Each of the windows W has a register OUT for output, a register LOCAL to be locally used, and a register IN for input. The registers OUT, LOCAL, and IN are also referred to as OUT registers, LOCAL registers, and IN registers. Each of the registers OUT, LOCAL, and IN has eight registers configured to hold data having parity data and ECC data added thereto, as indicated by parentheses in FIG. 3.

Numbers are assigned to the windows W included in the register file 510. The numbers after the symbols W correspond to the numbers assigned to the windows W. An OUT register of each of the windows W and an IN register of a window W adjacent to the window W use the same register. For example, the OUT register of the window W0 and the IN register of the window W1 use the same register. In addition, the OUT register of the window W7 and the IN register of the window W0 use the same register.

Since an OUT register of one window W of each adjacent pair of the windows W and an IN register of the other window W of each adjacent pair of the windows W share the same register, the eight windows W are coupled to each other in a ring fashion.

The work register 520 includes a current window W (for example, a window Wn) to be used for input and output of data from and to the computing section 600 and a next window W (for example, a window Wn+1) to be used for switching of windows W. Since an OUT register of the window Wn and an IN register of the window Wn+1 use the same register group (of eight registers), the work register 520 includes one OUT register, two LOCAL registers, and two IN registers.

For example, the current window W that is currently used is specified by a window pointer. When the current window W specified by the window pointer is switched to another window W, the master register 510 transfers, to the work register 520, the window W specified by the window pointer after the switching. The transfer of the window W means the transfer of data held in the window W. In the following descriptions of data transfer and the like, data held in a window W (or registers) is also merely referred to as the window W (or the registers). A time period (delay time) for the selection of a register may be reduced by the transfer of data to the computing section 600 via the work register 520 that has a register group smaller than that of the master register 510.

An instruction to switch a window W is, for example, a SAVE instruction, a RESTORE instruction, or the like. If the current window W is an n-th window Wn (n is an integer that is equal to or larger than 0 and equal to or smaller than 7), an n+1-th window Wn+1 is transferred from the master register 510 to the work register 520 by the execution of the SAVE instruction. If the current window W is the n-th window, an n−1-th window Wn−1 is transferred from the master register 510 to the work register 520 by the execution of the RESTORE instruction. If n is 7, the n+1-th window Wn+1 is the 0th window W0. If n is 0, the n−1-th window Wn−1 is the 7th window W7.

Operations of the arithmetic processing device 100 in a case where the SAVE instruction is executed are described with reference to FIG. 5 and the like. Operations of the arithmetic processing device 100 in a case where the RESTORE instruction is executed are the same as or similar to the operations of the arithmetic processing device 100 in the case where the SAVE instruction is executed, except that the windows W to be transferred are different from each other in the above cases.

The configurations of the master and work registers 510 and 520 are not limited to the example illustrated in FIG. 3. For example, the number of registers included in each of the OUT, LOCAL, and IN registers is not limited to 8.

Figure 4:
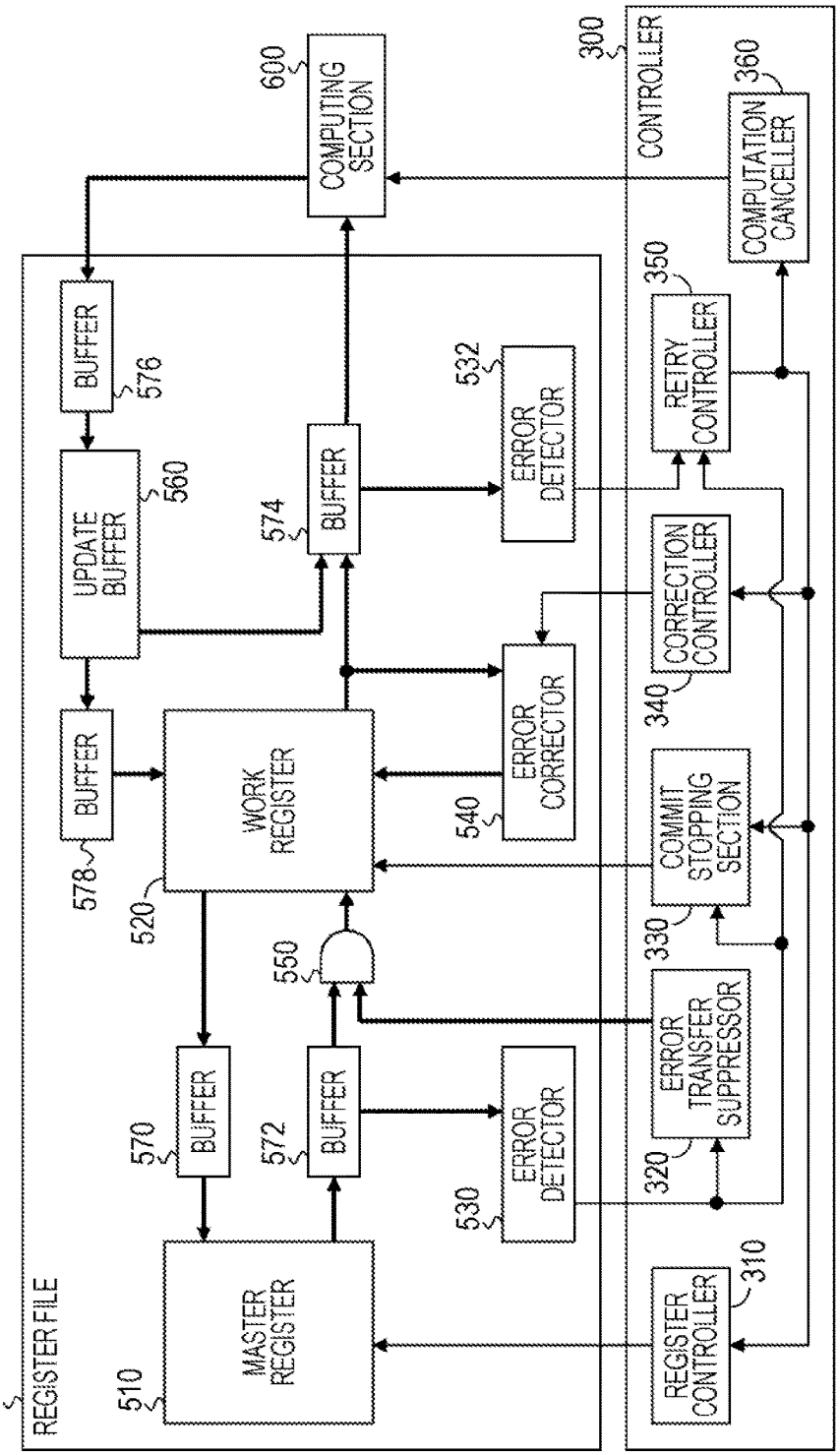
FIG. 4 is a diagram illustrating an example of a register file and a controller that are illustrated in FIG. 2.

FIG. 4 illustrates an example of the register file 500 and the controller 300 that are illustrated in FIG. 2. Solid arrows illustrated in FIG. 4 indicate data flow. FIG. 4 also illustrates the computing section 600 in order to simplify the data flow.

The register file 500 includes the master register 510, the work register 520, error detectors 530 and 532, an error corrector 540, an AND circuit 550, an update buffer 560, and buffers 570, 572, 574, 576, and 578. The controller 300 includes a register controller 310, an error transfer suppressor 320, a commit stopping section 330, a correction controller 340, a retry controller 350, and a computation canceller 360.

The master register 510 outputs, to the buffer 572, data held in a window W specified by the window pointer controlled by the register controller 310. The master register 510 receives, from the work register 520 via the buffer 570, data to be written back by the switching of window pointers.

The work register 520 receives, from the buffer 572 via the AND circuit 550, the data (data held in the window W specified by the window pointer) output from the master register 510. Thus, the current window W within the work register 520 is switched to the window W specified by the window pointer. If the error detector 530 detects an error in the data output by the master register 510, the work register 520 holds, as data of the current window W, dummy data (for example, data in which all bits are 0) received from the AND circuit 550.

The work register 520 outputs data to be used by the computing section 600 to the buffer 574. Then, the work register 520 receives a result computed by the computing section 600 via the buffer 576, the update buffer 560, and the buffer 578. For example, when the commit stopping section 330 executes control to stop a commit, data is not written to the work register 520 from the update buffer 560.

If the error corrector 540 corrects the error data, the work register 520 outputs the error data to the error corrector 540 and receives the data with the corrected error from the error corrector 540. Then, the work register 520 transfers the data with the corrected error to the master register 510 via the buffer 570.

The error detector 530 is an example of a first error detector configured to detect whether or not an error is included in data to be transferred from the first register section (for example, the master register 510) to the second register section (for example, the work register 520). For example, the error detector 530 receives, from the buffer 572, data (data held in a window W specified by the window pointer) output from the master register 510. Then, the error detector 530 uses parity data included in the data and the like to determine whether or not an error is included in the data, and the error detector 530 outputs the result of the determination to the error transfer suppressor 320, the commit stopping section 330, and the retry controller 350.

The error detector 532 is an example of a second error detector configured to detect whether or not an error is included in data to be transferred from the second register section (for example, the work register 520) to the computing section 600. For example, the error detector 532 receives, from the buffer 574, data output from the work register 520. Then, the error detector 532 uses parity data included in the data and the like to determine whether or not an error is included in the data, and the error detector 532 outputs the result of the determination to the retry controller 350. In the aforementioned manner, the error detector 532 may detect an error that occurred in the work register 520 or the like in the arithmetic processing device 100.

If the error detector 530 detects an error in data output by the master register 510, the error corrector 540 corrects the error based on an instruction from the correction controller 340. For example, the error corrector 540 receives the data held in the master register 510 via the work register 520 and corrects the error in the received data using ECC data and the like. Then, the error corrector 540 transfers the data subjected to the error correction to the master register 510 via the work register 520. Thus, the error in the data held in the master register 510 is corrected.

The AND circuit 550 is an example of a replacing section configured to replace error data with the dummy data that is not determined to have an error by the second error detector (for example, the error detector 532). The AND circuit 550 outputs, to the work register 520, a logical product of data received from the buffer 572 and data received from the error transfer suppressor 320.

For example, if the error detector 530 detects an error in data output by the master register 510, the AND circuit 550 receives, from the error transfer suppressor 320, the dummy data in which all the bits are 0. Thus, if the error detector 530 detects the error in the data output by the master register 510, the AND circuit 550 outputs, to the work register 520, the dummy data in which all the bits are 0.

For example, if the error detector 530 determines that the data output by the master register 510 does not include an error, the AND circuit 550 receives, from the error transfer suppressor 320, data in which all bits are 1. Thus, if the data output by the master register 510 does not include an error, the AND circuit 550 transfers the data output by the master register 510 to the work register 520.

The update buffer 560 is a register group to be used to manage commits for the master and work registers 510 and 520 and holds computed results and the like. For example, the update buffer 560 receives a computed result from the computing section 600 via the buffer 576. Then, the update buffer 560 transfers the computed result to the work register 520 via the buffer 578. Thus, a commit for writing the result computed by the computing section 600 to the work register 520 is terminated.

If the update buffer 560 executes a bypass process of transferring, to the computing section 600, the result computed by the computing section 600 as input data before causing the computed result to be stored in the work register 520, the update buffer 560 transfers, or bypasses, the computed result to the computing section 600 via the buffer 574.

The register controller 310 uses the window pointer and the like to control the transfer of data from the master register 510, the writing of data back to the master register 510, and the like.

The error transfer suppressor 320 suppresses the transfer of an error that occurred in the master register 510 to the computing section 600 and the like. For example, if the determination result received by the error transfer suppressor 320 from the error detector 530 indicates that the data includes an error, the error transfer suppressor 320 outputs, to the AND circuit 550, the dummy data in which all the bits are 0. If the determination result received by the error transfer suppressor 320 from the error detector 530 indicates that the data does not include an error, the error transfer suppressor 320 outputs, to the AND circuit 550, data in which all bits are 1.

If the error detector 530 detects an error in the data output by the master register 510, the commit stopping section 330 stops the commit for writing the result computed by the computing section 600 to the work register 520 and interrupts the execution of the instruction. For example, if the determination result received by the error transfer suppressor 320 from the error detector 530 indicates that the data includes an error, the commit stopping section 330 executes control on the work register 520 and the like and thereby stops the commit for writing the result computed by the computing section 600 to the work register 520.

In this manner, the commit stopping section 330 executes the control to stop the commit based on the result of the detection executed by the error detector 530 that executes the error detection at a time earlier than the time when the error detector 532 executes the error detection. Thus, the frequency at which the commit is not stopped in time may be reduced, compared with the case where the method (for example, a method in which the result of the determination by the error detector 532 is used for the determination of the stop of the commit) of detecting whether or not an error exists upon the transfer of data from the work register 520 to the computing section 600 is used.

The correction controller 340 controls, based on an instruction from the retry controller 350, the execution of the error correction by the error corrector 540.

The retry controller 350 re-executes the interrupted instruction after the error corrector 540 corrects the error in the data held in the master register 510. For example, if the determination result received by the retry controller 350 from the error detector 530 indicates that the data includes an error, the retry controller 350 causes the computation stopping section 360 to stop the computation by the computing section 600. Thus, the execution of the instruction is interrupted.

If the determination result received by the retry controller 350 from the error detector 530 indicates that the data includes an error, the retry controller 350 causes the correction controller 340 to control the error corrector 540 and thereby cause the error corrector 540 to correct the error. Then, the retry controller 350 controls the register controller 310 and the like and re-executes the interrupted instruction after the error in the data held in the master register 510 is corrected.

If the error detector 530 detects the error in the data output by the master register 510, the computation stopping section 360 stops the computation by the computing section 600 and thereby interrupts the execution of the instruction based on an instruction from the retry controller 350.

The configurations of the register file 500 and the controller 300 are not limited to the example illustrated in FIG. 4. For example, the AND circuit 550 may be arranged between the work register 520 and the buffer 574. In this case, the AND circuit 550 replaces error data output from the work register 520 with the dummy data and transfers the dummy data to the computing section 600 via the buffer 574. In addition, the error detector 532 may be arranged in the computing section 600. In this case, the AND circuit 550 may be arranged between the buffer 574 and the computing section 600. In addition, the computation stopping section 360 may receive, from the error detector 530, the result of determining whether or not the data output by the master register 510 includes an error, and the computation stopping section 360 may execute control to stop the computation by the computing section 600 based on the determination result received from the error detector 530.

Figure 5:
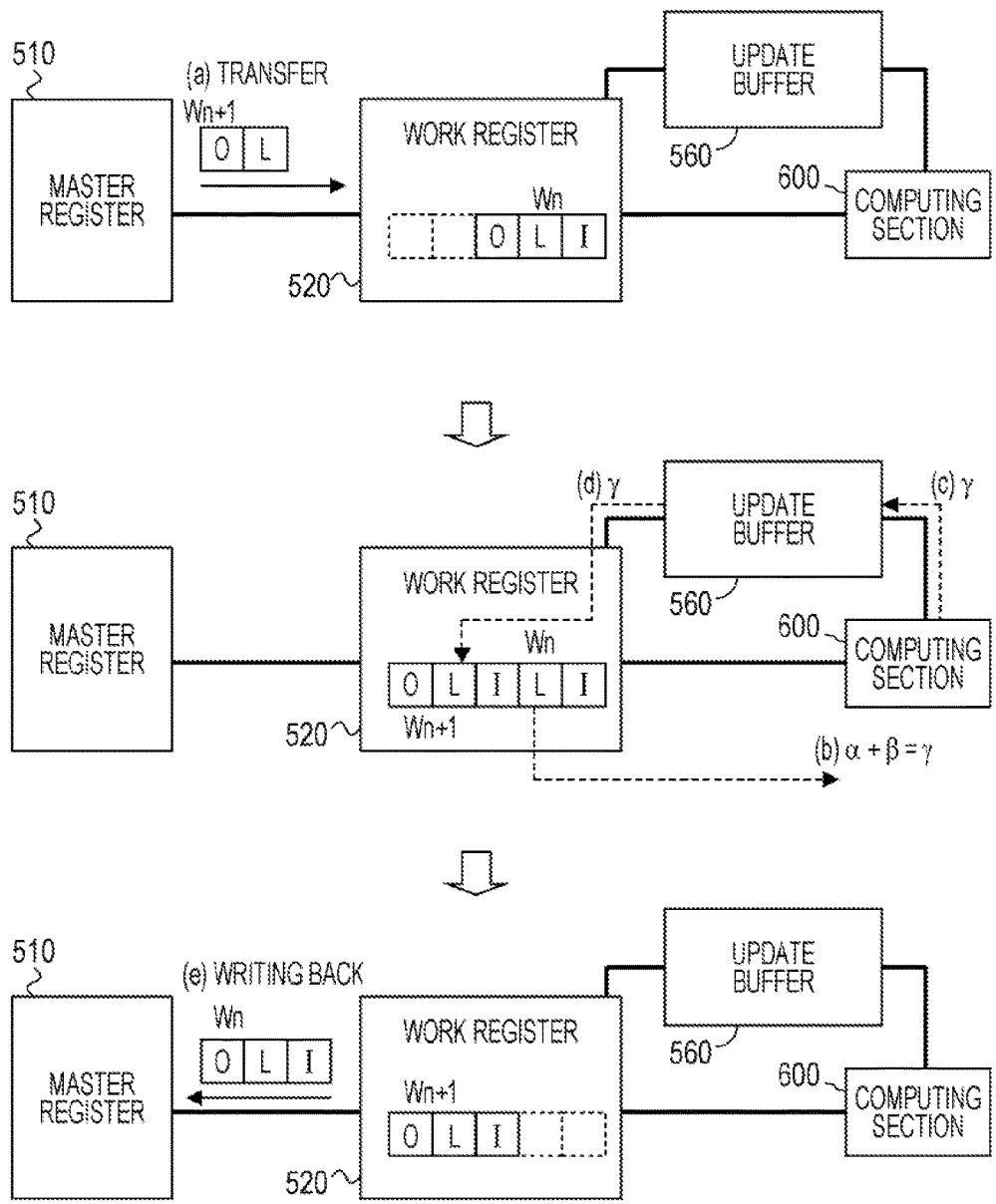
FIG. 5 is a diagram illustrating an example of an operation of the arithmetic processing device in a case where a SAVE instruction is executed.

FIG. 5 illustrates an example of an operation of the arithmetic processing device 100 in the case where the SAVE instruction is executed. The SAVE instruction is one of a plurality of multi-flow instructions, while each of the multi-flow instructions is obtained by dividing a single instruction into multiple flows and used to execute computation. The SAVE instruction is executed to switch windows W to be processed. Symbols O, L, and I indicate OUT, LOCAL, and IN registers. In FIG. 5, an illustration of the controller 300 illustrated in FIG. 4 and the like is omitted.

An operation of the arithmetic processing device 100 in a case where a number assigned to a window W used by the work register 520 is n and the SAVE instruction is issued is described with reference to FIG. 5. In the operation that is described with reference to FIG. 5, data held in the n+1-th window Wn+1 does not include an error.

When the SAVE instruction is issued, the master register 510 transfers the n+1-th window Wn+1 to the work register 520 ((a) illustrated in FIG. 5). An IN register of the window Wn+1 and an OUT register of the window Wn use the same register, as described with reference to FIG. 3. Thus, OUT and LOCAL registers of the window Wn+1 are transferred from the master register 510 to the work register 520.

The computing section 600 sums data $\alpha$ and $\beta$ held in the nth window Wn and causes the result $\gamma$ of the summing to be stored in the update buffer 560 ((b) and (c) illustrated in FIG. 5). Then, the controller 300 executes a commit for writing the summed result $\gamma$ held in the update buffer 560 to the n+1-th window Wn+1 ((d) illustrated in FIG. 5).

Then, the controller 300 executes a commit for writing the nth window Wn back to the master register 510 from the work register 520 ((e) illustrated in FIG. 5). The SAVE instruction is executed in a flow (hereinafter also referred to as flow 1) up to the writing of the summed result $\gamma$ to the window Wn+1 and a flow (hereinafter also referred to as flow 2) for writing the window Wn back to the master register 510 from the work register 520.

Figure 6:
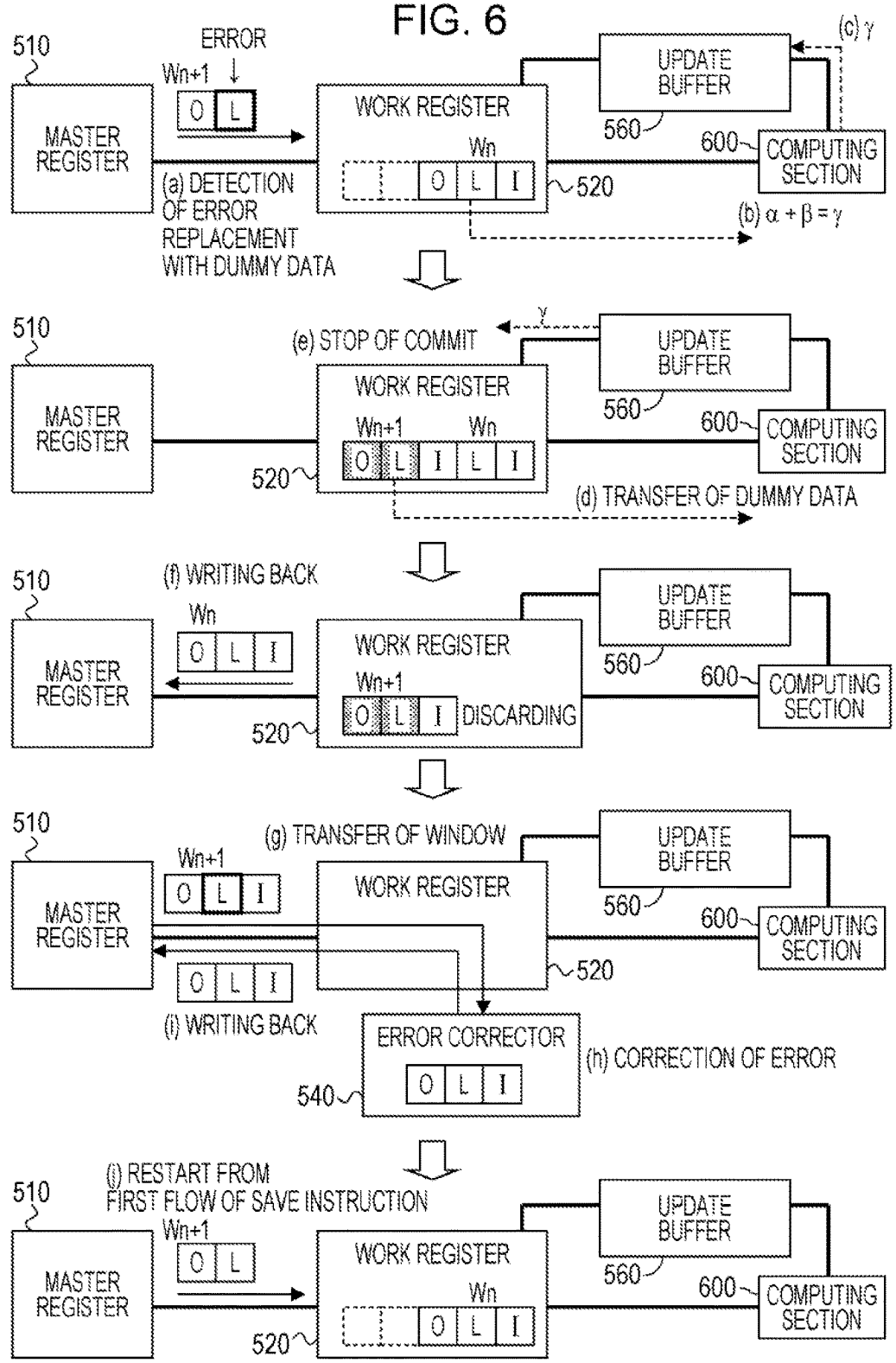
FIG. 6 is a diagram illustrating an example of an operation of the arithmetic processing device in a case where error correction is executed.

FIG. 6 illustrates an example of an operation of the arithmetic processing device 100 in a case where the error correction is executed. In FIG. 6, an illustration of the controller 300, error detectors 530 and 532, AND circuit 550, and the like that are illustrated in FIG. 4 is omitted. FIG. 6 illustrates the operation of the arithmetic processing device 100 in a case where a number assigned to a window W used by the work register 520 is n (or if the current window W is the window Wn) and the SAVE instruction is issued, similarly to FIG. 5. A detailed description of operations that are the same as or similar to the operations described with reference to FIG. 5 is omitted. A LOCAL register surrounded by a solid line in FIG. 6 holds data including an error, while OUT and LOCAL registers hatched in FIG. 6 hold the dummy data.

When the SAVE instruction is issued, the master register 510 transfers the n+1-th window Wn+1 to the work register 520. In this case, the error detector 530 detects an error in data (data held in the window Wn+1) output by the master register 510 ((a) illustrated in FIG. 6). Thus, the AND circuit 550 replaces the data output by the master register 510 with the dummy data and transfers the dummy data to the work register 520 ((a) illustrated in FIG. 6). Then, the computing section 600 sums the data α and β held in the nth window Wn and causes the summed result γ to be stored in the update buffer 560 ((b) and (c) illustrated in FIG. 6).

Then, the work register 520 transfers the dummy data held in the n+1-th window Wn+1 to the computing section 600 and the like ((d) illustrated in FIG. 6). Since the data output by the work register 520 is the dummy data, the error detector 532 does not detect an error in the data. In addition, the controller 300 stops the commit for writing the summed result γ held in the update buffer 560 to the n+1-th window Wn+1 ((e) illustrated in FIG. 6). Furthermore, the controller 300 stops the computation by the computing section 600. Thus, the currently executed instruction is interrupted.

Since the data transferred to the computing section 600 is the dummy data, the transfer of the error may be suppressed. For example, if an error is detected in the computing section 600, the computing section 600 may notify the controller 300 and the like of the error (state in which the instruction is not able to be re-executed) as an error that is not retryable, regardless of whether or not the instruction is able to be re-executed. In this case, even if the error data is corrected and the instruction is able to be re-executed, the instruction is not re-executed and the performance of the arithmetic processing device 100 is reduced. In other words, the transfer of the error may be suppressed by the replacement of the error data with the dummy data, and it may be possible to suppress the notification provided by the computing section 600 to the controller 300 and the like and indicating that the computing section 600 detected the error that is not retryable. Thus, the error data may be corrected, the instruction may be re-executed, and the reduction in the performance of the arithmetic processing device 100 may be suppressed.

Since the nth window Wn is normal data, the controller 300 writes the window Wn back to the master register 510 from the work register 520 after the interruption of the instruction ((f) illustrated in FIG. 6). In addition, since the dummy data is written over the window Wn+1 of the work register 520, the controller 300 discards the window Wn+1 of the work register 520.

Then, the master register 510 transfers the n+1-th window Wn+1 to be subjected to the error correction to the error corrector 540 via the work register 520 ((g) illustrated in FIG. 6). In the example illustrated in FIG. 6, data held in all registers of the window Wn+1 is transferred to the error corrector 540. The error corrector 540 corrects the error in the data received from the master register 510 via the work register 520 ((h) illustrated in FIG. 6). Then, the error corrector 540 writes the data (window Wn+1) with the corrected error back to the master register 510 ((i) illustrated in FIG. 6). The error correction may be executed only on the window Wn+1 among data held in the master register 510 or may be executed on all the data (all windows W) held in the master register 510.

The controller 300 restarts the instruction in order from the transfer (transfer of the window Wn+1 from the master register 510 to the work register 520) of the first flow of the SAVE instruction after the correction of the error data ((j) illustrated in FIG. 6). The window Wn (current window Wn) is transferred to the work register 520 and held in the work register 520 before the execution of the first flow of the SAVE instruction. Thus, the interrupted instruction is re-executed. Even if the data held in the master register 510 includes an error, the error may be corrected and the instruction may be re-executed.

Figure 7:
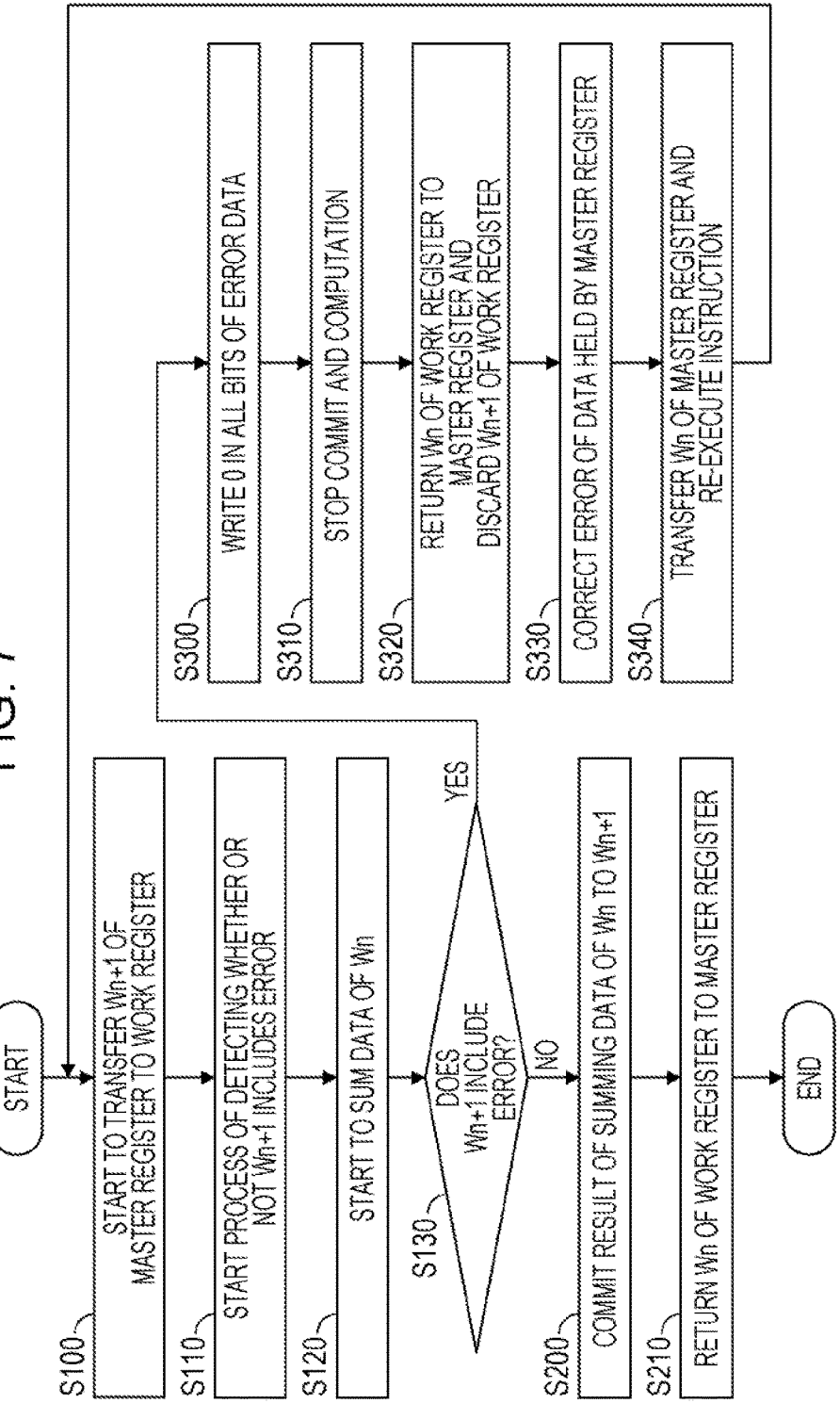
FIG. 7 is a diagram illustrating an example of an operation of the arithmetic processing device illustrated in FIG. 2.

FIG. 7 illustrates an example of an operation of the arithmetic processing device 100 illustrated in FIG. 2. Specifically, FIG. 7 illustrates the operation of the arithmetic processing device 100 in the case where the number assigned to the window Wn used by the work register 520 is n (or the current window W is the window Wn) and the SAVE instruction is issued. For example, a process of step S100 is executed by the issuance of the SAVE instruction.

In step S100, the master register 510 starts to transfer the n+1-th window Wn+1 to the work register 520, as described with reference to FIGS. 5 and 6.

In step S110, the error detector 530 starts a process of detecting whether or not the window Wn+1 output by the master register 510 includes an error. For example, the error detector 530 determines whether or not the window Wn+1 output by the master register 510 includes an error. The error detector 530 notifies the controller 300 of the result of the determination. Hereinafter, the process of detecting whether or not data includes an error is also referred to as an error detection process.

In step S120, the computing section 600 starts to sum data (for example, the data α and β illustrated in FIG. 5 and the like) held in the nth window Wn, as described with reference to FIGS. 5 and 6. The result of summing the data is stored in the update buffer 560, as described with reference to FIG. 5 and the like.

In step S130, the controller 300 determines whether or not the error detector 530 detected an error in the data output by the master register 510. If the error detector 530 detected the error in the data output by the master register 510 (or if the window Wn+1 includes the error), the operation of the arithmetic processing device 100 proceeds to step S300. On the other hand, if the error detector 530 does not detect any error in the data output by the master register 510 (or if the window Wn+1 does not include any error), the operation of the arithmetic processing device 100 proceeds to step S200.

The process of step S130 and the process of step S120 are executed in parallel. In FIG. 7, however, step S130 is illustrated after step S120 in order to simplify the branch of the operation to be executed when any error does not exist and the operation to be executed when an error exists.

In step S200, the controller 300 executes a commit for writing the result (for example, the summed result γ illustrated in FIG. 5 and the like) of summing the data held in the window Wn to the n+1-th window Wn+1, as described with reference to FIG. 5.

In step S210, the controller 300 returns the window Wn of the work register 520 to the master register 510, as described with reference to FIG. 5. Specifically, the controller 300 executes the commit for writing the nth window Wn back to the master register 510 from the work register 520. By the execution of the commit, the SAVE instruction is terminated.

If the window Wn+1 output by the master register 510 includes an error, the arithmetic processing device 100 executes processes (error correction and the like) of steps S300 to S340 before executing the process of steps S200 and S210 that are to be executed when the SAVE instruction is normally executed.

In step S300, the AND circuit 550 and the like write 0 in all bits of the error data output by the master register 510, as described with reference to FIG. 6. Thus, the dummy data in which all the bits are 0 is transferred as data of the window Wn+1 to the work register 520.

In step S310, the controller 300 stops the commit for writing the summed result held in the update buffer 560 to the window Wn+1 and stops the computation by the computing section 600, as described with reference to FIG. 6. Thus, the currently executed instruction is interrupted.

The error detector 530 determines whether or not an error exists upon the transfer of the data from the master register 510 to the work register 520. Thus, the error in the window Wn+1 is detected before the summed result obtained during the execution of the SAVE instruction is committed. Thus, the commit for writing the result computed using the data of the window Wn to the window Wn+1 may be stopped and the update of the window Wn+1 may be avoided. Since commits are executed in order, the commit for the result computed using the data of the nth window Wn is not executed after a commit for a result computed using data of the n+1-th window Wn+1 is executed.

In step S320, the controller 300 returns the window Wn of the work register 520 to the master register 510 and discards the window Wn+1 of the work register 520, as described with reference to FIG. 6.

In step S330, the error corrector 540 corrects the error in the data held in the master register 510, as described with reference to FIG. 6.

In step S340, the controller 300 transfers the window Wn of the master register 510 to the work register 520 and reproduces a state before the issuance of the SAVE instruction. Then, the controller 300 re-executes the instructions in order from the SAVE instruction. Thus, after the process of step S340 is executed, the operation of the arithmetic processing device 100 returns to step S100. The operation of the arithmetic processing device 100, however, is not limited to the example illustrated in FIG. 7.

FIG. 8 illustrates an example of a pipeline process of the arithmetic processing device 100 illustrated in FIG. 2. FIG. 8 illustrates a pipeline process to be executed in the case where the number assigned to the window W used by the work register 520 is n (or the current window W is the window Wn) and the SAVE instruction is issued.

Symbols P, PT, B1, B2, and X illustrated in FIG. 8 indicate cycles of pipeline stages. For example, in P cycles, instructions (flows if the instructions are multi-flow instructions) to be provided to the executing section 400 are determined. In PT cycles, the instructions determined in the P cycles are provided to the executing section 400. In B1 and B2 cycles, data to be used for computation is determined. In X cycles, the executing section 400 executes the instructions. In U cycles, computed results are written in the update buffer 560.

In C cycles, commits for completing the instructions (or the flows) are executed. For example, in a C cycle of the first flow of the SAVE instruction, a commit for writing a computed result to the work register 520 is executed. In a C cycle of the second flow of the SAVE instruction, a commit for writing the window Wn back to the master register 510 from the work register 520 is executed.

White star signs illustrated in FIG. 8 indicate that an error is not detected in the error detection process (for example, the error detection process executed by the error detector 530 illustrated in FIG. 4 or by the error detector 532 illustrated in FIG. 4), while black star signs illustrated in FIG. 8 indicate that an error is detected in the error detection process.

For example, a case 1 illustrated in FIG. 8 indicates the pipeline process executed in a case where an error is not included in the window Wn+1, and a case 2 illustrated in FIG. 8 indicates the pipeline process executed in a case where an error is included in the window Wn+1. A comparative example indicates a pipeline process of an arithmetic processing device that does not execute a process of determining an error upon the transfer of data from the master register 510 to the work register 520 and executes a process of determining an error upon the transfer of data from the second register section 12 to the computing section 13. In the comparative example, an error is included in the window Wn+1.

First, the case 1 is described below.

At a time T1, a process of a P cycle of a flow 1 of the SAVE instruction is executed. The flow 1 of the SAVE instruction is a flow up to the writing of a computed result to the window Wn+1 of the work register 520. In the P cycle of the flow 1 of the SAVE instruction, the transfer of the window Wn+1 from the master register 510 to the work register 520 is started and the error detection process is executed by the error detector 530.

At a time T2, a process of a PT cycle of the flow 1 of the SAVE instruction is executed and a process of a P cycle of the flow 2 of the SAVE instruction is executed. The flow 2 of the SAVE instruction is a flow of writing the window Wn back to the master register 510 from the work register 520, for example. At the time T2, the error detection process is terminated and it is determined that the window Wn+1 output from the master register 510 does not include an error.

At a time T3, a process of a B1 cycle of the flow 1 of the SAVE instruction is executed, a process of a PT cycle of the flow 2 of the SAVE instruction is executed, and a process of a P cycle of an instruction 1 that is the next instruction of the SAVE instruction is executed. Data held in the window Wn+1 is used in a process of an X cycle of the instruction 1 (next instruction of the SAVE instruction), for example.

At a time T4, a process of a B2 cycle of the flow 1 of the SAVE instruction is executed and a process of a PT cycle of the instruction 1 is executed.

At a time T5, a process of an X cycle of the flow 1 of the SAVE instruction is executed and a process of a B1 cycle of the instruction 1 is executed. For example, in the X cycle of the flow 1 of the SAVE instruction, the error detection process executed by the error detector 532 is terminated and it is determined that data output from the window Wn of the work register 520 does not include an error. Then, the computing section 600 sums data held in the window Wn.

At a time T6, a process of a U cycle of the flow 1 of the SAVE instruction is executed and a process of a B2 cycle of the instruction 1 is executed. For example, in the U cycle of the flow 1 of the SAVE instruction, the result of summing the data held in the window Wn is written in the update buffer 560.

At a time T7, a process of a C cycle of the flow 1 of the SAVE instruction is executed and a process of the X cycle of the instruction 1 is executed. For example, in the C cycle of the flow of the SAVE instruction, a commit for writing the computed result (result of summing the data held in the window Wn) held in the update buffer 560 to the work register 520 is executed. Then, the flow 1 of the SAVE instruction is terminated.

In the X cycle of the instruction 1, the error detection process executed by the error detector 532 is terminated and it is determined that data output from the window Wn+1 of the work register 520 does not include an error, for example. Then, the computing section 600 executes the computation using the data held in the window Wn+1.

At a time T8, a process of a C cycle of the flow 2 of the SAVE instruction is executed and a process of a U cycle of the instruction 1 is executed. For example, in the C cycle of the flow 2 of the SAVE instruction, a commit for writing the window Wn back to the master register 510 from the work register 520 is executed. Thus, the window Wn of the work register 520 is returned to the master register 510, and the flow 2 of the SAVE instruction is terminated. Specifically, the SAVE instruction is terminated.

At a time T9, a process of a C cycle of the instruction 1 is executed. Thus, the instruction 1 is terminated. In the case 1, the window Wn+1 does not include an error, and the SAVE instruction and the instruction 1 (next instruction of the SAVE instruction) are not re-executed and are normally terminated.

Next, the case 2 is described. A detailed description of processes that are the same as or similar to the processes described with reference to the case 1 is omitted.

At the time T1, the process of the P cycle of the flow 1 of the SAVE instruction is executed. In the P cycle of the flow 1 of the SAVE instruction, the transfer of the window Wn+1 from the master register 510 to the work register 520 is started and the error detection process is executed by the error detector 530.

At the time T2, the process of the PT cycle of the flow 1 of the SAVE instruction is executed and the process of the P cycle of the flow 2 of the SAVE instruction is executed. At the time T2, the error in the window Wn+1 output from the master register 510 is detected. Thus, the controller 300 executes control to stop a commit for the flow 1 of the SAVE instruction. In addition, the AND circuit 550 transfers the dummy data (for example, the data in which all the bits are 0) as the data of the window Wn+1 to the work register 520.

At the time T3, the process of the B1 cycle of the flow 1 of the SAVE instruction is executed, the process of the PT cycle of the flow 2 of the SAVE instruction is executed, and the process of the P cycle of the instruction 1 (next instruction of the SAVE instruction) is executed.

At the time T4, the process of the B2 cycle of the flow 1 of the SAVE instruction is executed and the process of the PT cycle of the instruction 1 is executed.

At the time T5, the process of the X cycle of the flow 1 of the SAVE instruction is executed and the process of the B1 cycle of the instruction 1 is executed. For example, in the X cycle of the flow 1 of the SAVE instruction, it is determined that the data output from the window Wn of the work register 520 does not include an error. Then, the computing section 600 executes the computation and thereby sums the data held in the window Wn.

At the time T6, the process of the U cycle of the flow 1 of the flow 1 of the SAVE instruction is executed and the process of the B2 cycle of the instruction 1 is executed. For example, in the U cycle of the flow 1 of the SAVE instruction, the result of summing the data held in the window Wn is written in the update buffer 560.

At the time T7, the process of the X cycle of the instruction 1 is executed. The process of the C cycle of the flow 1 of the SAVE instruction is not executed at the time T7 since the controller 300 executes control to stop the commit for the flow 1 of the SAVE instruction.

In the X cycle of the instruction 1, the computing section 600 executes the computation using the dummy data output from the window Wn+1 of the work register 520, for example. Since the data output from the window Wn+1 of the work register 520 is the dummy data, the error detector 532 determines that the data output from the window Wn+1 of the work register 520 does not include an error. In this manner, the transfer of the error to the computing section 600 and the like may be avoided by the replacement of the data held in the window Wn+1 of the work register 520 with the dummy data.

At the time T8, the process of the U cycle of the instruction 1 is executed. Since the commit for the flow 1 of the SAVE instruction is stopped, a commit for the flow 2 of the SAVE instruction is not executed. Since commits are executed in order, the commit for the result computed using the data of the nth window Wn is not executed after the commit for the result computed using the data of the n+1-th window Wn+1 is executed.

In a time period from a time T9 to a time Tj, the controller 300 stops the computation by the computing section 600 and causes the error corrector 540 to correct the error in the data held in the master register 510. Thus, the data held in the master register 510 is corrected to normal data. After the error in the data held in the master register 510 is corrected (for example, after the time Tj+1), the instruction is re-executed.

At the time Tj+1, the SAVE instruction is re-executed. For example, the process of the P cycle of the flow 1 of the SAVE instruction is executed.

At a time Tj+2, the process of the PT cycle of the flow 1 of the SAVE instruction is executed and the process of the P cycle of the flow 2 of the SAVE instruction is executed. Since the error is corrected, it is determined that the window Wn+1 output from the master register 510 does not include an error.

Processes executed at a time Tj+3 and later are the same as or similar to the processes executed at the time T3 and later. In the case 2, the error is detected upon the transfer of the data from the master register 510 to the work register 520 (for example, at the time T2), and the commit for the flow 1 of the SAVE instruction may be stopped. Thus, the instructions (SAVE instruction and instruction 1) may be re-executed after the error in the data held in the master register 510 is corrected. The SAVE instruction and the instruction 1 (next instruction of the SAVE instruction) may be normally terminated, since the instructions are re-executed after the error correction.

In the comparative example, the error detection process is not executed upon the transfer of the data from the master register 510 to the work register 520 (for example, at the time T2) and is executed at the time T7.

For example, in the comparative example, at the time T7, the process of the C cycle of the flow 1 of the SAVE instruction is executed and the process of the X cycle of the instruction 1 (next instruction of the SAVE instruction) is executed. For example, in the X cycle of the instruction 1, the error in the window Wn+1 output from the work register 520 is detected. Thus, control is executed to stop the commit for the flow 1 of the SAVE instruction. In the comparative example illustrated in FIG. 8, at the time T7, the process of the C cycle of the flow 1 of the SAVE instruction is executed and the commit for the flow 1 of the SAVE instruction is not stopped in time. Thus, the computed result (result of summing the data held in the window Wn) held in the update buffer 560 is written to the work register 520, and the flow 1 of the SAVE instruction is terminated.

In the comparative example, at the time T8, the process of the C cycle of the flow 2 of the SAVE instruction is executed and the SAVE instruction is terminated. In the comparative example, the commit for the flow 1 of the SAVE instruction is not stopped in time and the SAVE instruction is not able to be re-executed. If the SAVE instruction is not re-executed, the instruction 1 that is the next instruction of the SAVE instruction is not re-executed. If the error in the data held in the master register 510 is corrected and the instruction 1 is re-executed, the SAVE instruction is not re-executed and the result of the computation executed in accordance with the SAVE instruction is not reproduced.

On the other hand, in the arithmetic processing device 100, the commit for the flow 1 of the SAVE instruction is stopped based on the result of the error detection process executed upon the transfer of the data from the master register 510 to the work register 520, as described with reference to the case 2. Thus, the frequency at which the commit for the flow 1 of the SAVE instruction is not stopped in time may be reduced, and the frequency at which the instructions are not re-executed may be reduced.

In the embodiment illustrated in FIGS. 2 to 8, the effects that are the same as or similar to the effects obtained in the embodiment illustrated in FIG. 1 may be obtained. For example, the error detector 530 detects, upon the transfer of data from the master register 510 to the work register 520, whether or not the data includes an error. Then, if the error detector 530 detects that the data includes the error, the controller 300 interrupts the instruction based on the detection. Thus, the arithmetic processing device 100 may reduce the frequency at which the instruction is not interrupted in time (the commit is not stopped in time) and reduce the frequency at which the instruction is not re-executed, compared with the case where the method of detecting whether or not an error exists upon the transfer of data from the work register 520 to the computing section 600 is used. As a result, a reduction in the performance of the arithmetic processing device 100 may be suppressed.

In addition, if the error detector 530 detects an error in data output by the master register 510, the error transfer suppressor 320 and the AND circuit 550 replace the error data output by the master register 510 with the dummy data and transfer the dummy data to the work register 520. This may suppress the transfer of the error to the computing section 600 and the like.

For example, the computing section 600 receives the dummy data and thus does not detect the occurrence of an error. Thus, it may be possible to suppress a notification provided by the computing section 600 to the controller 300 and the like and indicating that the computing section 600 detected an error that is not retryable. Thus, error data may be corrected, an instruction may be re-executed, and a reduction in the performance of the arithmetic processing device 100 may be suppressed.

The features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
a first register configured to hold first data to be used to execute an instruction;
a second register coupled to the first register and configured to hold, as second data, a portion of the first data held in the first register which is to be transferred by the first register to the second register;
a computing circuit coupled to the second register and configured to execute computation using the second data, held in the second register and transferred by the second register to the computing circuit, according to the instruction;
a first error detector coupled to the first register and configured to detect whether or not an error is included in the portion of the first data to be transferred by the first register to the second register and before the portion of the first data is transferred from the second register to the computing circuit;
a second error detector coupled to the second register and configured to detect an error in the second data to be transferred by the second register to the computing circuit;
a replacing circuit configured to replace the second data having the error with dummy data that is determined not to have an error by the second error detector before the transfer of the portion of the first data having an error detected by the first error detector to the computing circuit if the first error detector detects the error in the portion of the first data;
a controller, coupled to the first error detector and to the computing circuit, and configured to interrupt the execution of the instruction if the first error detector detects the error in the portion of the first data; and
an error corrector coupled to the controller and configured to correct the error in the first data held in the first register if the first error detector detects the error in the portion of the first data.

2. The arithmetic processing device according to claim 1, wherein the replacing circuit replaces the portion of the first data having an error output from the first register section with the dummy data and transfers the dummy data to the second register.

3. The arithmetic processing device according to claim 1, wherein the replacing circuit replaces the second data having the error output from the second register section with the dummy data and transfers the dummy data to the computing circuit.

4. The arithmetic processing device according to claim 1, wherein if the first error detector detects the error in the portion of the first data, the controller interrupts the execution of the instruction by stopping the computation by the computing circuit.

5. The arithmetic processing device according to claim 4, wherein after the first error corrector corrects the error in the first data held in the first register, the controller re-executes the interrupted instruction.

6. The arithmetic processing device according to claim 1, wherein if the first error detector detects the error in the portion of the first data, the controller stops a commit for writing a result of the computation by the computing circuit to the second register and interrupts the execution of the instruction.

7. A method of controlling an arithmetic processing device including a first register configured to hold first data to be used to execute an instruction, a second register configured to hold, as second data, a portion of the first data held in the first register which is to be transferred from the first register to the second register, and a computing circuit configured to execute computation using the second data held in the second register, comprising:

causing a first error detector included in the arithmetic processing device to detect whether or not an error is included in the portion of the first data to be transferred by the first register to the second register and before the portion of the first data is transferred from the second register to the computing circuit;

causing a second error detector included in the arithmetic processing device to detect an error in the second data to be transferred by the second register to the computing circuit;

causing a replacing circuit included in the arithmetic processing device to replace the second data having the error with dummy data that is determined not to have an error by the second error detector before the transfer of the portion of the first data having an error detected by the first error detector to the computing circuit if the first error detector detects the error in the portion of the first data;

causing a controller included in the arithmetic processing device to interrupt the execution of the instruction if the first error detector detects the error in the portion of the first data; and causing an error corrector included in the arithmetic processing device to correct the error in the first data held in the first register if the first error detector detects the error in the portion of the first data.

* * * * *